United States Patent [19]
Perlowin

[11] 3,893,532
[45] July 8, 1975

[54] POWER ASSISTED GOLF CART
[75] Inventor: Paul R. Perlowin, Concord, Calif.
[73] Assignee: Panpacific Recreational Products, Concord, Calif.
[22] Filed: Apr. 29, 1974
[21] Appl. No.: 464,868

[52] U.S. Cl............ 180/19 R; 74/230.7; 280/DIG. 5
[51] Int. Cl.............................................. B62d 51/04
[58] Field of Search.................. 180/19 R, 6.5, 65 R; 280/DIG. 5; 74/219, 230.7

[56] References Cited
UNITED STATES PATENTS
3,704,758   12/1972   Cropp............................. 180/19 R
3,812,929   5/1974    Farque........................... 180/6.5

*Primary Examiner*—Leo Friaglia
*Assistant Examiner*—John A. Pekar
*Attorney, Agent, or Firm*—Townsend and Townsend

[57] ABSTRACT

A power assisted manually operated golf cart is disclosed. The golf cart has a frame which supports a golf bag in an inclined position, the lower portion of the frame being adapted to rest on the ground when the cart is stationary. A pair of spaced wheels are attached to the frame and provide support for the frame when the cart is in motion. In the present invention, an electric motor is located adjacent each of the wheels, and drive trains connect each of the electric motors to its adjacent wheel. Each drive train includes an elastic drive belt to insulate the electric motor from shocks on the wheels caused by irregularities in the terrain. Also, the drive belts are adapted to slip if power is accidentally applied when the wheels are rotating backwardly to protect the electric motors and insure that the drive train is not damaged.

6 Claims, 4 Drawing Figures

3,893,532
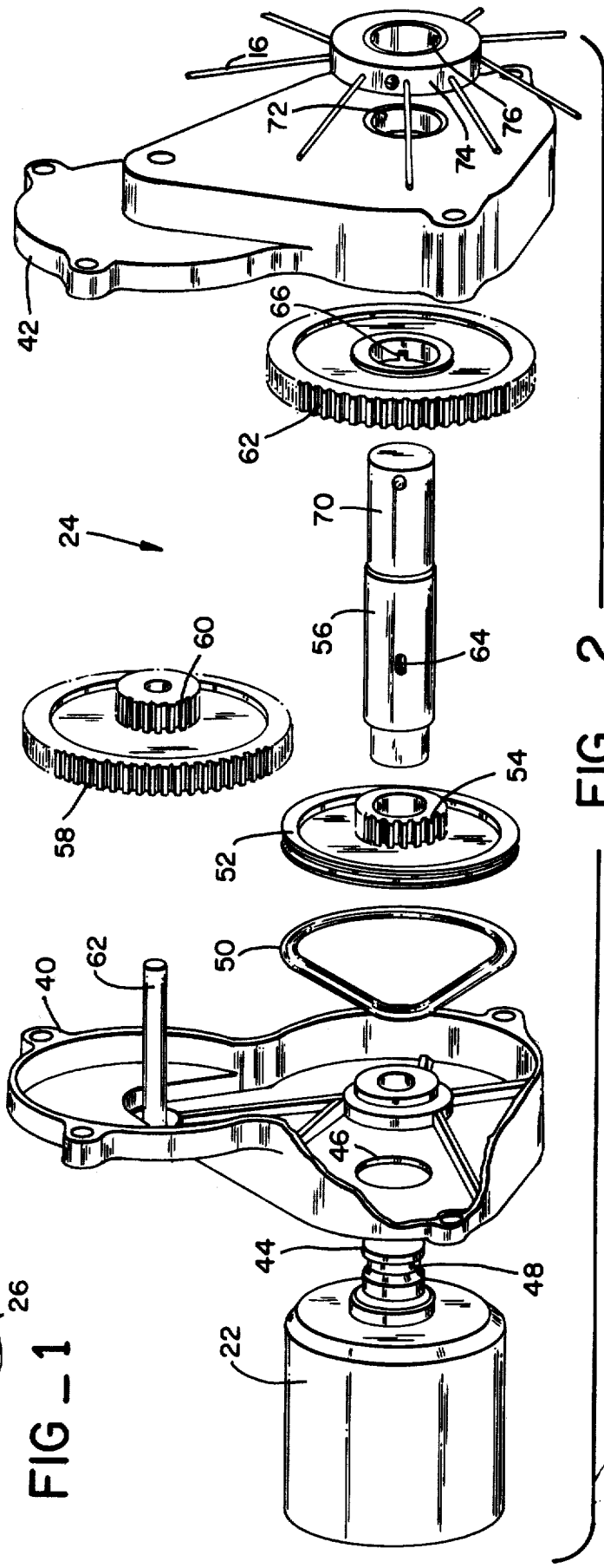
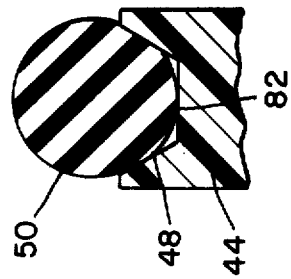
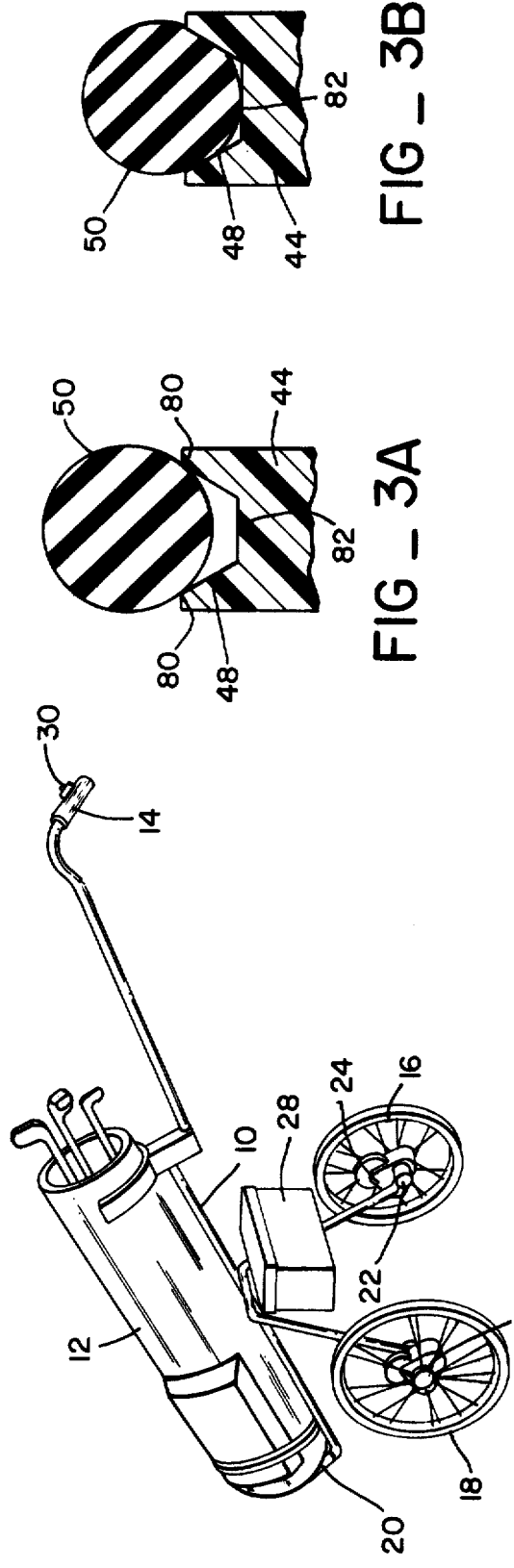

POWER ASSISTED GOLF CART

BACKGROUND OF THE INVENTION

The present invention relates to manually operated golf carts, and in particular to a power assisted manually operated golf cart.

The concept of providing a power assist to a manually operated golf cart is not new. Such apparatus are disclosed in the patent to Voigt, U.S. Pat. No. 2,706,008 and the patent to Jacobs, U.S. Pat. No. 3,123,173. The difficulty with such mechanisms is that the driving apparatus is too heavy to be incorporated in the standard two-wheel golf cart. The drive train would have to be relatively strong, and correspondingly heavy, to withstand the jolts which are encountered when the cart is pulled over the ground. As a result, power assisted golf carts found in the prior art all require three wheels to adequately support the cart. Thus, the resulting prior art mechanisms are too heavy to be conveniently used and transported in the sense of conventionally available two-wheel carts. As a consequence, such power-assisted carts are not now in common usage.

An additional problem with power assisted golf carts found in the prior art is that complex mechanisms are required in order that the cart can be moved backwardly without damaging the motor. The apparatus disclosed by U.S. Pat. No. 2,706,008 requires a complex switching arrangement in order that the cart can be operated in reverse. The U.S. Pat. No. 3,123,713 requires a mechanism for disengaging the power assist from the wheels when the device is moved backwardly. Such mechanisms add to the weight and complexity of the system. Furthermore, when the cart encounters rocks or other obstacles and is moved for a short distance backwardly to avoid the obstacle, the operator quite often neglects to manually disengage the motor, with likely damage thereto. Also, the operator may inadvertantly engage the motor when the cart is moving backwardly which can damage the motor. Each if the motor is not damaged, the gears in the drive train will be forced together and caused to more rapidly become worn and fail.

SUMMARY OF THE INVENTION

The present invention provides a power assisted golf cart which is generally similar to the well known standard two-wheel golf carts that are commonly used by golfers. Such two-wheel golf carts have a frame which supports a golf bag in an inclined position. The lower portion of the frame is adapted to rest on the ground when the cart is stationary. A pair of spaced wheels are attached to the frame and provide support for the frame when the cart is in motion. In the present invention, electric motors are located adjacent each of the wheels, and drive trains connect each of the motors to its adjacent wheel. Each drive train includes an elastic drive belt to insulate the electric motor from shocks on the wheels caused by irregularities in the terrain. Also, the drive belts are adapted to slip if the motors are accidentally engaged when a wheel rotates backwardly to protect the electric motors.

When the golf cart passes over the ground, the wheels are subjected to numerous minor jolts caused by irregularities in the terrain. If a direct gear system is utilized between the cart wheels and the electric motors, such jolts can damage the drive train and electric motor. In order to accommodate such jolting, golf carts found in the prior art use a relatively heavy drive train and large electric motors. However, the present invention provides an elastic drive belt as part of the drive train, and this drive belt absorbs minor jolts so that the engine is not damaged.

The electric motors of the present invention are provided with output pulleys having a truncated V-shaped groove, and the drive belt comprises an elastic O-ring. When the cart is operated forwardly in the normal manner, the elastic O-ring will be stretched over the drive pulley and will be engaged by the groove to drive the cart. However, when the cart moves backwardly with the motor off, the O-ring will not be driven by the drive pulley, and it will be subjected to less tension over the drive pulley. The O-ring will remain engaged with the drive pulley as long as the motor is off and the friction in the motor will inhibit rolling of the cart downhill. The motor friction is magnified by the drive train to provide substantial resistance to acceleration of the cart downhill.

If the motor is accidentally engaged when the cart is moving backwardly, the O-ring will pop out of the groove. As a result, the drive belt will be free to slide along the outer edges of the truncated V-shaped groove and will not be rigidly engaged with the drive pulley. This will prevent rotation of the electric motor in the reverse direction when it is activated which may damage the electric motor, and alleviates the necessity for complex switching mechanisms found in the prior art golf carts. Also, damage to the drive train by driving it in a direction opposite from movement of the wheel is prevented. Furthermore, when large irregularities are encountered in the terrain so that one of the wheels of the cart moves backwardly while the motor is running, the drive belt associated with that wheel will merely slip over the drive pulley and the electric motor will not be damaged.

While prior art golf carts have employed both large, heavy drive trains to withstand jolts caused by rough features in the terrain, and complex switching mechanisms to allow the cart to move backwardly, such features are eliminated by the apparatus of the present invention. The provision of an elastic drive belt in the drive trains reduces both the cumbersome structure presently required and conventional reduction gears in the train assembly. Light nylon gears can be substituted for heavy metal gears without fear of breaking the gears or the motors. As a result, the present invention provides a lightweight power assist mechanism that can be incorporated into a standard two-wheel golf cart. The golf cart of the present invention can be conveniently used and transported much like standard manually operated golf carts found in the prior art.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a golf cart embodying the present invention;

FIG. 2 is an exploded view of the electric motor and drive train assembly of the present invention;

FIG. 3A and B are fragmentary side elevation views of the drive belt and drive pulley assembly of the present invention in its neutral and driven configurations respectively.

DESCRIPTION OF THE PREFERRED EMBODIMENT

A two-wheeled golf cart 10 carrying a golf bag 12 is illustrated by way of reference to FIG. 1. Golf cart 10 is manually operated by means of a handle 14 similar to two-wheel golf carts found in the prior art. Golf cart 10 is supported by wheels 16, 18 when the cart is in motion. In addition, when the cart is stationary, the lower portion 20 of cart 10 is formed to rest on the ground.

Golf cart 10 illustrated in FIG. 1 additionally includes a pair of electric motors such as 22 mounted adjacent each wheel 16, 18. Drive assemblies 24, 26 are provided that connect the electric motors with their adjacent wheels to drive the wheels. Battery 28 is mounted to cart 10 to supply electric power to the electric motors, and the power supply is controlled by a push button swtich 30 on handle 14 of golf cart 10. When golf cart 10 is to be moved forwardly, push button 30 is manually depressed to activate the electric motors and drive the golf cart. When the cart is at rest or being moved backwardly, the motors are not activated but the friction in the motors partially brakes the cart. Push button 30 is ordinarily not depressed when the cart moves backwardly, but if it is accidentally depressed, the apparatus will not be damaged as discussed hereinbelow.

The construction of the drive train assemblies such as 24 of the present invention is illustrated in more detail by way of reference to the exploded view of FIG. 2. Drive train 24 includes a pair of housing members 40, 42 which can be bolted together to enclose the drive train assembly. Electric motor 22 has a drive pulley 44 which projects through an aperture 46 in housing member 40 interior to the housing. Drive pulley 44 has a truncated V-shaped groove 48, the purpose of which will be explained in more detail hereinafter. The base of groove 48 is flat for ease of construction so that the groove is actually trapezoidal-shaped in the configuration of a truncated V.

An elastic rubber O-ring 50 is used as a drive belt in drive train 24. O-ring 50 rides in groove 48 in drive pulley 44 and also circumscribes a nylon idler pulley 52. The diameter of idler pulley 52 is substantially larger than that of drive pulley 44, and a smaller idler gear 54 is fixed to idler pulley 52 to provide a first reduction stage. Pulley 52 and gear 54 ride on axle 56 which is the axle of wheel 16 which supports the golf cart. A second reduction stage is provided by nylon gears 58, 60 which ride on an idler shaft 62 fixed to housing member 40. Relatively large gear 48 engages the relatively small gear 54 and, in combination with the small gear 60, provides a second reduction stage. Nylon gear 62 is engaged with relatively smaller gear 60 and is driven thereby. Gear 62 circumscribes axle 56, and peg 64 on the axle engages a complementary key 66 in gear 62 so that gear 62 is non-rotatably mounted to axle 56.

The exterior portion 70 of axle 56 projects through an aperture 72 in housing member 42 to engage the hub 74 of wheel 16. Hub 74 includes a one-way clutch 76 which engages exterior portion 70 of axle 56. One-way clutch 76 allows wheel 16 to freewheel in the forward direction, but not rearwardly. Hence, the golf cart can be drawn forwardly independent from the drive train assembly 24. However, rearward movement of wheel 16 will force axle 56 and corresponding members of the drive train assembly to rotate backwardly.

The interaction between elastic O-ring drive belt 50 and drive pulley 44 is more fully illustrated by way of reference to FIGS. 3A and B. In FIG. 3A, drive belt 50 is illustrated in its non-tensioned configuration which it assumes when power is not being applied by drive pulley 44. In this configuration, the diameter of drive belt 50 is too large to allow it to fit into the truncated V-shaped groove 48 in drive pulley 44. Rather, drive belt 50 rests on the outer edges 80 of groove 48 to provide a minimal frictional surface between drive pulley 44 and drive belt 50, and the belt will easily slip with respect to the drive pulley if power is applied to the drive pulley. If no power is applied to drive pulley 44 but the cart is moving backwardly, there is sufficient friction so that belt 50 will turn drive pulley 44 to inhibit rearward movement of the cart.

In FIG. 3B, drive belt 50 is shown tensioned by force exerted by drive pulley 44 when the cart moves forwardly so that the diameter of the elastic drive belt is smaller. Drive belt 50 thus fits within groove 48 and touches the base of the V so that it is locked in position with respect to the drive pulley. The drive pulley can be covered with a rough phenolic surface to increase the relative friction between the pulley and the drive belt. In this configuration, power applied by the electric motor will act to drive the drive belt and force the corresponding wheel to turn to drive the cart.

In operation, the golf cart 10 of the present invention can be operated as a standard two-wheel golf cart if desired. One-way clutch 76 allows the golf cart to be pulled forwardly withoht engaging the electric motors or drive trains. However, if a power assist is desired, push button 30 can be depressed which activates the electric motor and drives wheels 16, 18 in the forward direction. When minor bumps and jolts are encountered by wheels 16, 18 as the cart moves over the golf course, such jolting is isolated from the electric motor 22 by elastic drive belts 50 so that the electric motors are not damaged. To stop forward motion of the golf cart, push button 30 is disengaged.

As long as power is supplied by the electric motor such as 22 and cart 10 moves forwardly, drive belt 50 will be tensioned over drive pulley 44 and will be forced down into truncated V-shaped slot 48 as illustrated in FIG. 3B. This will maintain drive belt 50 engaged with drive pulley 44 so that electric motor 22 drives its associated wheel. However, when the cart is operated in reverse, nylon idler pulley 52 will drive the drive belt 50 rather than drive pulley 44 to provide a braking force. If power is accidentally applied, the drive pulley disengages itself with groove 48 in drive pulley 44 as illustrated in FIG. 3A. In this configuration, drive belt 50 will ride along the outer edges of groove 48 and will slip with respect to the drive pulley, preventing damage to the electric motors. Also, when wheels 16, 18 receive large jolts, drive belt 50 will merely disengage from drive pulley 44 to prevent mashing of the gears and damage to the electric motor.

While the preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. In a manually operated golf cart comprising a frame for supporting a golf bag in a position inclined from vertical, said frame having a lower portion adapted to abut the ground when the cart is at rest to partially support said golf bag, and a pair of spaced wheels rotatably attached to the frame to provide the support for said frame when the cart is in motion, the improvement comprising:
   a pair of electric motor means located adjacent the respective wheels; and
   a pair of drive train means connecting each electric motor means to its adjacent wheel respectively for driving said wheel with said motor, each said drive train means including an elastic drive belt to insulate each electric motor means from its associated wheel so that shocks on the wheels are at least partially insulated from the electric motor means.

2. A golf cart as recited in claim 1 wherein each electric motor means includes a drive pulley having a truncated V-shaped groove circumscribing said pulley, and wherein said drive belt has a circular cross section, the diameter of said drive belt adapted so that the drive belt fits within the groove in the drive pulley upon tensioning of said drive belt by application of power by said electric motor means, said drive belt sufficiently loosely wound around the drive pulley so as to otherwise ride on the edges of the groove in the drive pulley, so that the drive belt is maintained in frictional engagement with said drive pulley when the electric motor means operates to propel the cart forwardly and slips if power is accidentally applied when the cart is motivated backwardly to prevent damage to said electric motor means.

3. A manually operated golf cart as recited in claim 2 wherein said drive train means additionally includes an idler pulley adapted to be circumscribed by the drive belt, and a plurality of reduction gears attached to said idler pulley and adapted to drive the associated wheel.

4. In a manually operated golf cart having a frame adapted to support a golf bag in a position inclined from vertical, a pair of spaced wheels rotatably attached to the frame and adapted to support said frame when the cart is in motion, the improvement comprising:
   a pair of electric motors located adjacent each of the wheels respectively and adapted to drive said wheels; and
   a pair of drive train means interposed between each electric motor and its adjacent wheel, each said drive train means including a drive pulley attached to the output shaft of the electric motor, said drive pulley having a circumferential groove having a V-shaped configuration, an elastic drive belt adapted to circumscribe said drive pulley and having a circular cross section, an idler pulley having a diameter large relative to the diameter of the drive pulley, said drive belt adapted to circumscribe said idler pulley, a sequence of reduction gears attached at one end to the idler pulley and the other end to the axle of the wheel, and one-way clutch means interposed between the axle and the wheels so that the wheel is rotatable with respect to said axle in the forward direction only, the diameter of said belt adapted so that the belt fits within the groove of the drive pulley when the vehicle is powered forwardly so that the drive belt remains in frictional engagement with the drive pulley, said drive belt being sufficiently loosely wound around the drive pulley so as to otherwise ride on the edges of the groove in the drive pulley so that said drive belt is moveable with respect to said drive pulley.

5. A golf cart as recited in claim 4 wherein the interior portion of the V-shaped groove is flat so that said groove has a trapezoidal configuration.

6. A golf cart as recited in claim 4 wherein the drive pulley is coated with a phenolic resin to increase the surface friction of said drive pulley.

* * * * *